United States Patent [19]

Heberling

[11] 4,246,757

[45] Jan. 27, 1981

[54] COMBUSTOR INCLUDING A CYCLONE PRECHAMBER AND COMBUSTION PROCESS FOR GAS TURBINES FIRED WITH LIQUID FUEL

[75] Inventor: Paul V. Heberling, Scotia, N.Y.

[73] Assignee: General Electric Company, Schenectady, N.Y.

[21] Appl. No.: 24,265

[22] Filed: Mar. 27, 1979

[51] Int. Cl.³ ............................................. F02C 7/22
[52] U.S. Cl. ..................................... 60/737; 431/183
[58] Field of Search .................. 60/39.74 R, 39.69 R, 60/39.71, 737, 743; 431/9, 183

[56] References Cited

U.S. PATENT DOCUMENTS

| | | | |
|---|---|---|---|
| 2,601,000 | 6/1952 | Nerad | 60/39.65 |
| 3,030,773 | 4/1962 | Johnson | 60/39.65 |
| 3,648,457 | 3/1972 | Bobo | 60/39.74 R |
| 3,958,413 | 5/1976 | Cornelius et al. | 60/39.06 |

OTHER PUBLICATIONS

Roberts, P. B. et al., Advanced Low NO$_x$... Turbines, ASME Paper, Mar. 1976, pp. 1-19, New Orleans.
Roberts, P. B. et al., Wide Range Operation... Combustors, ASME Paper, Apr. 1978, pp. 1-12. London.
Tanasawa, Y. et al., On the Vortex... Turbine, ASME Paper, Oct. 1971, pp. 1-8, Tokyo.

Primary Examiner—Jerry W. Myracle
Attorney, Agent, or Firm—Robert R. Schroeder; James C. Davis, Jr.; Paul R. Webb, II

[57] ABSTRACT

A combustor useful for combustion of initially liquid fuel to provide motive fluid for gas turbines is described. The combustor includes an air-swirling cyclonic prechamber having a wide-angle spray-cone liquid nozzle and opening to a downstream combustion chamber. The prechamber provides long residence time for liquid fuel being vaporized therein, short residence time for the resulting mixture of fuel vapor and air, and capability for minimal formation of nitrogen oxides.

8 Claims, 6 Drawing Figures

COMBUSTOR INCLUDING A CYCLONE PRECHAMBER AND COMBUSTION PROCESS FOR GAS TURBINES FIRED WITH LIQUID FUEL

BACKGROUND OF THE INVENTION

The present invention relates to a combustion apparatus including a cyclonic prechamber and to a combustion process, which may be carried out in the combination apparatus. The combustion process and apparatus are especially applicable to gas turbines fired on liquid fuel, including such turbines employed for electric power generation as in the electric utility industry.

Gas turbine combustors operated on liquid fuel are prone to unacceptably high formation of nitrogen oxides ($NO_x$) from the standpoint of increasingly rigid government standards. Numerous combustors and processes have been proposed wherein the liquid fuel would be prevaporized, i.e. converted to vapor or gaseous form prior to combustion, and the heat for fuel vaporization would be provided by hot air supplied to the combustor. However, in many of the proposed combustors the liquid fuel residence time required for a minimally acceptable extent of prevaporiztion has required an inordinately large prechamber, frequently resulting in autoignition therein of the fuel/air mixture during operation.

It has now been found by practice of the present invention that the problems of $NO_x$ formation and autoignition in combustion of normally liquid fuel can be at least substantially reduced in a simple, efficient manner. The combustion apparatus and process of this invention provide good balance between sufficiently long residence time of liquid fuel in a prechamber or prevaporization zone for effective fuel vaporization therein and sufficiently short residence time of the ignitable mixture of the resulting fuel vapor with hot air as to substantially avoid autoignition in the prechamber and minimize flashback from a downstream combustion chamber over a variety of operating conditions.

DESCRIPTION OF THE INVENTION

Generally stated, in one aspect, this invention provides a combustion apparatus useful especially for combustion of initially liquid fuel to provide motive fluid for gas turbines, including the heavy-duty type employed for electric power generation as in the electric utility industry. The apparatus comprises a combustion liner defining a combustion chamber terminating at its upstream end in an inlet throat and termination downstream thereof in an outlet for exhausting combustion gases. Also included is a prechamber assembly including a cyclonic prechamber adapted to vaporize liquid fuel therein. The prechamber is substantially cylindrical through at least a portion of its axial extent, terminates at its downstream end in the throat, and opens to the combustion chamber therethrough. The assembly further includes a plurality of converging, spacedapart, highly-angled vanes disposed circumferentially about the cylindrical portion of the prechamber. Opposing faces of each pair of adjacent vanes define inwardly converging airflow channels adapted to introduce air therethrough with a high tangential component of velocity into the prechamber. A means (e.g. a nozzle) is provided in flow communication with the upstream end of the prechamber for introducing liquid fuel with a spray pattern in the form of a substantially hollow cone coaxial with the prechamber. The spray cone has a vertex angle sufficiently large such that the introduced fuel is directed toward an upstream portion of each vane and not toward the throat opening. An ignitor is provided in the combustion chamber for igniting the mixture of air and vaporized fuel received in premixed form from the prechamber.

Generally stated, in another aspect, this invention provides a combustion process wherein a liquid fuel is prevaporized and the resulting vapor is premixed with the combustion air in a cyclonic zone in which hot air is introduced and swirled with a high tangential velocity component to produce a substantially uniform mixture of fuel vapor and air. While the hot air is continuously introduced to form the high velocity swirl pattern, the fuel vapor/air mixture is continuously discharged through a throat into a combustion zone where combustion thereof is continuously effected. The process may be carried out in the above-described apparatus.

BRIEF DESCRIPTION OF THE DRAWING

This invention will be better understood from the following detailed description taken with the accompanying drawing wherein the best mode contemplated for carrying out the invention is illustrated. In the drawing, wherein like numerals refer to similar elements throughout.

DETAILED DESCRIPTION OF THE INVENTION AND MANNER AND PROCESS OF MAKING AND USING IT

Figure 1:
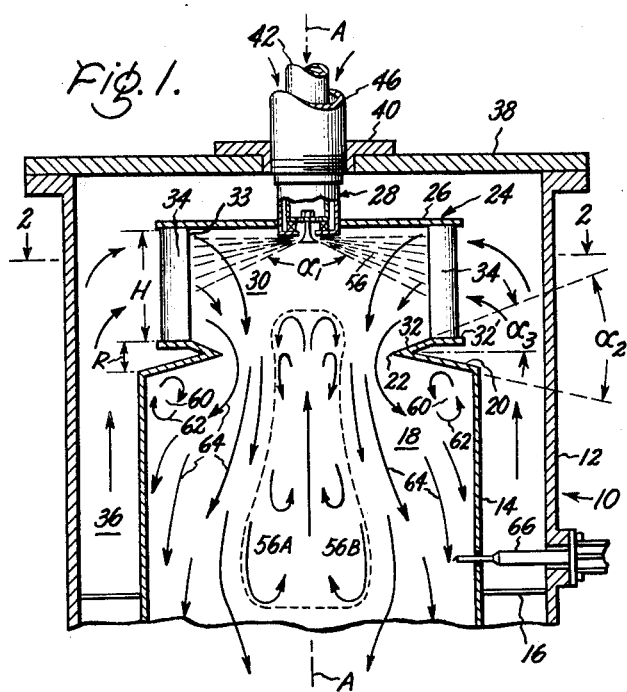
FIG. 1 is an elevational view, partly in section, of a combustor including a cyclonic prechamber in accordance with a preferred embodiment of this invention.
Figure 2:
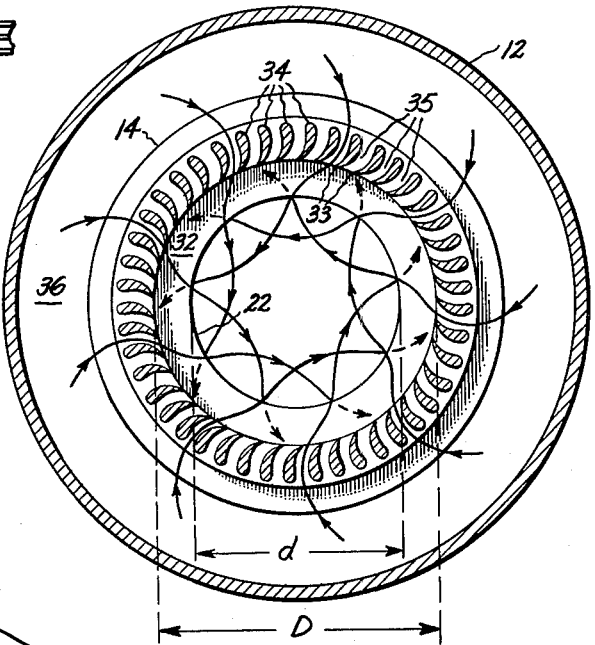
FIG. 2 is a sectional view taken on line 2—2 of FIG. 1 and illustrating the cyclonic prechamber when viewed in the direction of its axis.

Referring now to the drawing and especially to FIGS. 1-2, there is fragmentarily shown combustion apparatus or combustor 10. Although the combustor is shown with its axis A—A oriented in a vertical direction, it can be employed with its axis in a horizontal or other suitable direction. Horizontal orientation of the axis is preferred for a variety of gas turbine engines employed in electric power generation. The combustor may be used to provide motive fluid for these and other gas turbine engines. Included in the combustor are casing 12 and combustion liner 14 held in spaced relation to each other by any suitable means, preferably a number of circumferentially spaced radially extending fins 16 welded or otherwise secured to the casing and liner.

Combustion liner 14, which may be of any suitable shape and preferably is a generally cylindrical wall, partially defines combustion chamber 18 open at the downstream or exhaust end (not shown), which may be connected in any suitable manner to the motive fluid inlet of a gas turbine. The chamber is partially closed at the other or upstream end by inlet wall 20 terminating in throat 22. Although the inlet wall may be of annularly flat or other suitable shape, it preferably is of generally frusto-conical shape, as shown. The chamber is also partially closed at its upstream end by cyclonic prechamber assembly 24, which includes upstream cover plate 26 having liquid fuel nozzle assembly 28 projecting therethrough in preferably coaxial relationship with the combustor.

As used in this description and in the claims which follow, unless otherwise indicated the terms "downstream" and "upstream" refer to locations or directional senses toward the top and toward the bottom, respectively, in FIG. 1.

The prechamber assembly 24 includes cyclonic prechamber 30, which may be solely of generally cylindrical form. The prechamber preferably has an upstream generally cylindrical portion and an adjoining downstream generally frusto-conical portion 32 terminating in the throat 22. The generally cylindrical portion of the prechamber is bordered by the radially inner envelope formed by trailing edges 33 of a plurality of converging, spaced apart, high angle vanes 34 disposed circumferentially about the cylindrical upstream portion. The vanes are preferably secured at their axially downstream ends by welds or other securing means to flat ring-shaped extension 32' of the wall defining the portion 32.

Opposing faces of each pair of adjacent vanes define inwardly converging airflow channels 35 for introduction into the cyclonic chamber of combustion air supplied to the channels, as from annular flow volume 36. The combustion air is preferably supplied at a sufficiently high temperature to rapidly vaporize liquid fluid supplied through fuel nozzle assembly 28. The vanes are so structured and oriented relative one to another that the combustion air can be introduced into the prechamber with a high tangential velocity, preferably with a ratio of tangential velocity to radial velocity of greater than 3:1. Such introduction of the incoming air directs it along a path which is nearly tangetial to produce the swirling motion of a vortex into which the nozzle-supplied liquid fuel is introduced as described in greater detail below.

As used herein, the term "tangential" when used with reference to the incoming combustion air, means that the air flow at the instant of its introduction into the prechamber is at least substantially tangential to the envelope of the trailing edges of the vanes included in the array of vanes.

Figure 3:
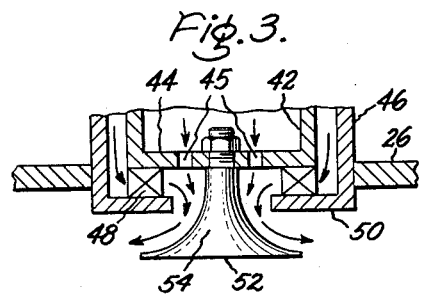
FIG. 3 is a fragmentary view showing in greater detail the liquid fuel nozzle employed in the combustor.

Fuel nozzle assembly 28, which extends through an opening in casing head wall 38, is supported therein by flange 40 secured by mating threads, welds, or other suitable means to both the nozzle assembly and to the head wall, which in turn is welded or removably secured to side wall 12. The nozzle assembly also extends through an opening in the cover plate 26 and terminates within the prechamber in outlet structure which is preferably disposed closely adjacent the upstream end of the prechamber. The illustrated and preferred nozzle is an air-assist spray nozzle effective for atomizing liquid hydrocarbon fuel, e.g. No. 2 distillate oil, which is supplied through central conduit 42 provided with capped end 44 having a plurality of circumferentially-spaced holes 45 (FIG. 3). Atomizing air at a pressure at least slightly above that in the prechamber 30 is supplied through the annular cavity defined principally by the outer surface of conduit 42 and the inner surface of coaxial conduit 46. The atomizing air flows through a plurality of schematically illustrated swirl vanes 48, which are secured at axial ends thereof to cap 44 and lip or extension 50 of conduit 46. Depending centrally and axially from cap 44 is pintle 52 having arcuately diverging lower portion 54 for introducing liquid fuel into the prechamber with a spray pattern in the form of a substantially hollow cone coaxial with the prechamber. Swirl vanes 48 are preferably structured and arranged such that the induced swirl of atomized fuel discharged from the nozzle swirls in the same angular direction as the combustion air swirls in the prechamber, i.e. counter-clockwise in FIGS. 3 and 4.

The hollow cone spray pattern 56 (FIG. 1) has a cone vertex angle $\alpha_1$ sufficiently large such that the introduced liquid fuel is directed toward the prechamber vanes 34 and not toward the opening defined by throat 22. To insure sufficient residence time of the liquid fuel for substantially complete vaporization thereof in the prechamber, the cone vertex angle must be at least 120°, preferably 140°–180°, and more preferably 160°–180°.

If, as preferred, atomizing air is employed, the mass flow rate thereof should be substantially less than the mass flow rate of the combustion air admitted through the vane channels and preferably is substantially equal to the mass flow rate of the fuel. The temperature of the atomizing air need not be elevated since the source of heat for vaporization of the fuel is contained in the relatively high temperature combustion air.

In the prechamber, the swirling mass of high-velocity air vaporizes the introduced liquid fuel at a rapid rate while the liquid fuel droplets are migrating radially outward toward the vanes under the centrifugal force field developed by the swirling mass. The centrifugal force field advantageously increases the residence time of the liquid fuel by effecting impingement and deposition of droplets thereof on the surfaces of the vanes.

The high velocity combustion air entering through the channels reatomizes liquid fuel deposited thereon, typically in the form of a thin film. A given liquid droplet of a first size will undergo at least partial vaporization by the incoming air as the droplet migrates or is thrown outwardly toward the vanes and decreases in size as a result of the partial vaporization thereof. The fuel vapor, being of lower density than the liquid, is swirled generally inwardly with the air. The overall effect for a large number of vaporizing droplets is that the vaporized portion thereof intimately mixes with the air to form a substantially homogeneous mixture of air and fuel vapor in the prechamber. After a short elapsed time from the formation of the vapor, the highly-swirling air/fuel vapor mixture exits the prechamber through the throat into combustion chamber 18 followed by combustion therein. The tangential velocity component of the swirling air/fuel vapor mixture in the prechamber increases as it approaches (i.e. spirals inwardly toward) the axis, thereby increasing the velocity and intensity of the swirl, which continues as this mixture enters the combustion chamber. The high-intensity of the swirl effects an axial low pressure region in the combustion chamber and induces recirculation zone 56 along a portion of the axis A—A. This recirculation zone aids in stabilizing the combustion.

Each vane preferably presents a continuous or uninterrupted flow-conducting surface, while the array of vanes is preferably free of channel-defining members closely adjacent the envelope defined by the radially outer or leading edges of the vanes. These features of individual vanes and the vane array substantially preclude formation of localized recirculation zones adjacent the vanes and attendant losses of air pressure, while aiding in introduction of the incoming air with high tangential velocity.

Although any suitable number of prechamber vanes may be employed, the number thereof is preferably at least 2D where "D" represents the inside diameter of the prechamber as measured across the envelope defined by the trailing edges of the vanes (see FIG. 2).

Figure 4:
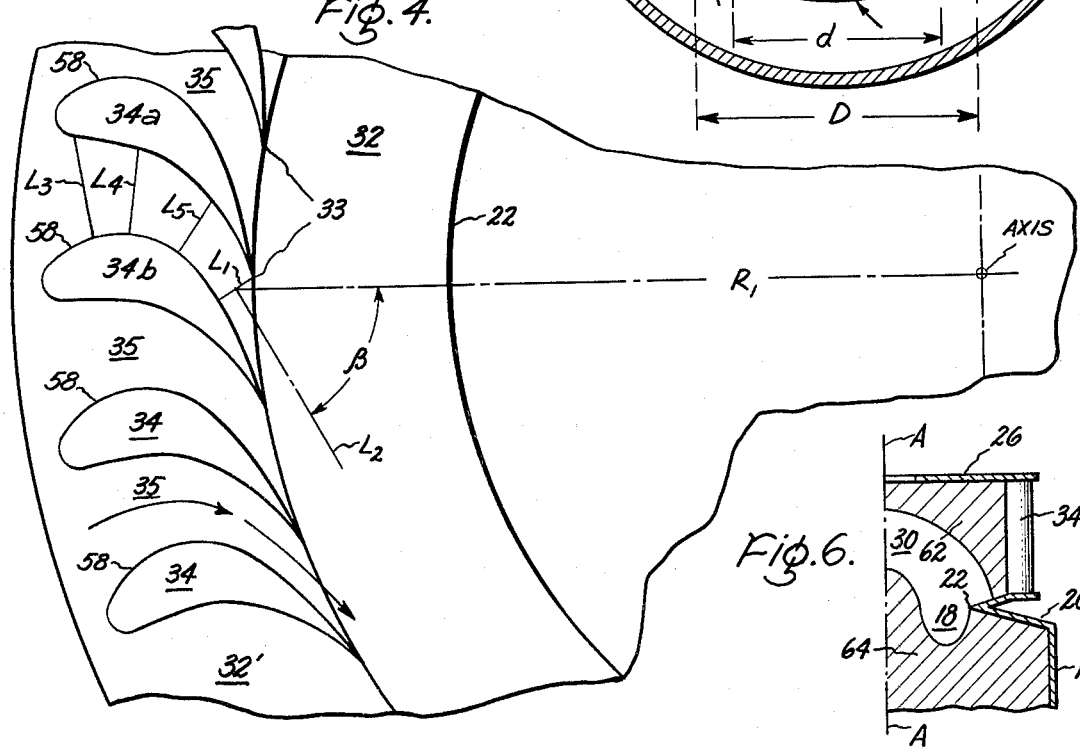
FIG. 4 is a fragmentary view showing a number of the vanes of FIG. 2 in greater detail.

In order to achieve maximum tangential velocity of the incoming air while minimizing the resulting or associated pressure drop of the air flow through the vane channels, the ratio of the total channel flow area to the cylindrical area of the prechamber is an important feature of this invention. The value of this ratio may be, for example, from about 0.05:1 to about 0.5:1, preferably from about 0.1:1 to about 0.4:1, especially about 0.25:1. The aforesaid values are for measurements of the two areas in like units, e.g. square inches. The "channel flow area" for a given channel is illustrated in FIG. 4 by line $L_1$. Such flow area is the minimum flow area for a given channel. Line $L_1$ is the shortest line which both (a) extends from the trailing edge of one vane (referenced as vane 34a in FIG. 4) to the radially outer adjacent vane (referenced as vane 34b) and (b) is perpendicular to the surface of the latter vane in which such line terminates. Following the terminology employed for vanes in the gas turbine art, the side or surface of vane 34b involved in the immediately preceding definition of the shortest line is referred to herein as low pressure side or surface 58. The numerical value of the generally rectangular flow area corresponding to line $L_1$ is obtained by multiplying the length of line $L_1$ by the axial length H (FIG. 1) of the vanes. The total channel flow area is the sum of the flow areas for each channel. The value of the cylindrical area of the prechamber is given by the formula $\pi \times D \times H$, wherein D and H have their above given definitions and are measured in like units.

The vane angle can be somewhat critical since it influences the residence time of liquid fuel in the prechamber. As used herein, the term "vane angle" means the angle B formed by (a) line R' extending radially from the center or axis of the prechamber to the midpoint of line $L_1$ and (b) line $L_2$ which extends perpendicularly to line $L_1$ from the midpoint thereof into the prechamber. The vane angle may be, for example, from about 60° to 90°, preferably from about 70° to 90°, e.g. about 80°. Vane angles of less than 60° should be avoided since, in general, they tend to result in deleterious combustion conditions, such as for example high $NO_x$ formation believed to result from discharge of unacceptably high amounts of liquid fuel droplets of 10 micron size or larger into the combustion chamber.

The air flow channels 35 preferably converge inwardly in a gradual manner as indicated by the sequentially decreasing lengths of lines $L_3$, $L_4$, $L_5$ and $L_1$ in the order given.

Figure 5:
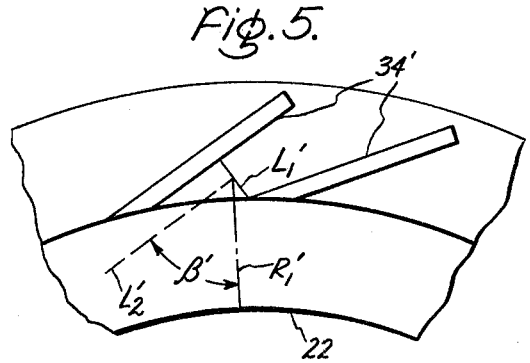
FIG. 5 is a fragmentary view of an array of vanes according to another embodiment of this invention.

Although prechamber vanes of any suitable cross-section shape may be employed, the curved airfoil shape shown in FIG. 4 for vanes 34 is preferred. Other suitable vanes are generally straight vanes 34' having preferably tapered or beveled trailing edges 35' (FIG. 5). The vanes, whether straight, curved, or otherwise shaped, preferably terminate in sharp trailing edges. Such edges are found to aid in reatomization of liquid fuel impinged and collected on the vanes.

The length of vanes employed is preferably sufficiently large such that, as shown by the array of vanes in FIGS. 4 and 5, each vane is overlapped by a succeeding vane in the sense that no radius of the prechamber could be extended to a point outside the vanes without intersecting at least one vane. This feature aids in preventing discharge of liquid fuel droplets from the prechamber through the vane channels.

The interior surfaces of the prechamber 30 and of the main chamber 18 in the throat region represented axially by distance R (FIG. 1) preferably present a sharp change in direction relative to the axis A—A. This sharp change in direction is illustrated by acute angle $\alpha_2$ which may be 75° or less and preferably 45° or less, e.g. about 30°. Such sharp change in direction is found to aid in establishing a toroidal recirculation zone 60 of burning fuel/air mixture rotating both about its circular axis (as indicated by arrows 62) and about axis A—A of the combustion chamber and lying radially outwardly of the swirling flow regime indicated by arrows 64. The recirculation zones 56 and 60 coexist during normal or continued combustion and aid in improving combustion efficiency.

Ignition is initially effected by means of spark plug 66 which may be of any suitable construction. If desired, the spark plug may be retracted from chamber 18 after ignition is effected by employing well-known retraction structure and techniques.

The high swirl of combustion air introduced through the vane channels is continued during continued combustion.

The angle $\alpha_3$ formed between the frusto-conical surface 32 and the plane passing through the throat 22 may be, for example, from essentially 0° to about 45°, preferably from essentially 0° to about 30°, e.g. about 20°, so that the swirl of air and fuel vapor premixed in the prechamber is not recirculated to any substantial degree therein, thereby aiding in minimization of risk of autoignition therein.

It is to be understood that the prechamber component of the combustion apparatus of this invention automatically increases the residence time of liquid fuel until it has vaporized to a substantial extent prior to exiting into the combustion chamber. In general, up to about 20% by weight of the fuel admitted to the combustion chamber through throat 22 may be in the form of very small liquid droplets, i.e. 10 microns in diameter or less, without detracting from the effective utility of the invention. In general, such very small droplets have the combustion characteristics of prevaporized fuel from the standpoint of low $NO_x$ formation and low flame temperature. It has been found in a number of actual runs with the illustrated apparatus that a small axial flame zone having a temperature above the average temperature of the total flame occurs along the axis of the prechamber. In a preferred mode of operation, such higher temperature flame pilots the surrounding combustion of principally vaporized fuel in a lean fuel-to-air ratio mixture and advantageously imparts increased flame stability and flexibility of operation to the combustor from the standpoint of the range of overall fuel-to-air ratio of mixtures which may be effectively burned therein. Although $NO_x$ formation is somewhat larger than such higher temperature axial zone is present, relative to the amount of $NO_x$ formation in the absence thereof, the advantages more than compensate for the slightly higher $NO_x$ formation. In order to better accommodate such higher temperature axial zone, the prechamber is preferably of open cylndrical or frusto-conical/cylindrical form, i.e., free of axially disposed centerbody structure such as that shown in ASME Papers 76-GT-12 (Roberts) and 76-GT-128 (Roberts et al), published by the American Society of Mechanical Engineers (1976), and the like.

Figure 6:
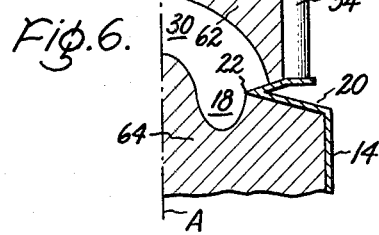
FIG. 6 is a schematic illustration of preferred operating conditions for the combustor.

As shown in FIG. 6, combustion apparatus 10 is adapted for operation using air and fuel mass flow rates adjusted so that the velocity component of the fuel/air mixture in the prechamber extending from the region 62 containing unvaporized fuel toward the flame envelope 64 exceeds the flame propagation velocity, thereby substantially avoiding flashback into such region.

Arrows not specifically identified herein illustrate schematically the various flows of air, fuel, or fuel/air mixtures in preferred operation of the combustion apparatus. Arrows 66 (FIG. 2) generally illustrate the flow of air per se or fuel/air mixtures formed therein from hot air supply line 36, through channels 35 into the prechamber and exiting therefrom through throat 22. The dotted or dashed portions of the arrows indicate the swirling flow of the generally homogeneous mixture of air and principally vaporized fuel for a short period after entering the combustion chamber.

The prechamber may have a ratio of axial length (from cover 26 to throat 22) to inside diameter of, for example, from about 0.2:1 to about 1.2:1, preferably from about 0.3:1 to about 1:1, e.g. about 0.6:1.

As a general preference, the throat diameter "d" is 10 inches or less.

Liner 14 may have through holes (not shown) spaced circumferentially and axially apart such that a portion of the combustion air flowing through annular chamber 36 forms a flowing layer of air adjacent the inner surface of the liner for cooling thereof.

The materials of construction which may be employed for the structure of the various components of the apparatus may be of any suitable composition. The preferred materials of construction for the following components are indicated in parentheses following the name of the component: vanes 34 or 34' (hardened Type 416 stainless steel), liner 14, wall 20 and frusto-conical wall 32 (Hastelloy X nickel-containing alloy), prechamber head 26 (carbon steel), casing 12 and headwall 38 (boiler plate steel of pressure vessel quality).

In one specific combustor in accordance with this invention substantially as illustrated in FIGS. 1–4, thirty-six vanes 34 were employed. Each vane had a maximum width from leading to trailing edge of 1.75 inches and a height of 6 inches. Each distance $L_1$ was 0.34 inch, resulting in a total channel flow area of 73.4 square inches. The diameter of throat 22 was 7.5 inches resulting in a total throat area of 44.2 square inches. The prechamber diameter D was 9.75 inches and its axial length was substantially 6 inches with angle $\alpha_2$ being essentially 0°. The vane angle $\beta$ was about 60°. The combustion chamber was 14 inches in diameter and 38 inches long and of cylindrical construction. Its liner 14 was cooled on the outer surface by convection and on the inner surface by admitting air from annular chamber 36 through a plurality of generally rectangular slits, each $\frac{3}{8}$ inch by 0.015 inch, to provide film cooling. The number density of the slits averaged 60 per 100 square inches of wall area but were of higher density upstream and lower density downstream. The axial gap between the lip 50 and the pintle 54 was 0.15 inch and the circular lip opening was 2.60 inches in circumference. The base 52 of the pintle was spaced about $\frac{1}{4}$ inch from the cover plate and the nozzle was coaxial with the combustor axis. Liner portion 20 was substantially perpendicular to the axis. Spark plug 66 was 12 inches below the throat.

The combustor was operated at a pressure of one atmosphere (about 14.7 psia) with air at a flow rate of 4.63 pounds per second (lb/sec) pressurized to about 110 psia by a compressor and heated to a temperature of 631° F. by an indirect preheater and then reduced to a pressure of about 15.5 psia by an orifice plate. Approximately 2.7 lb/sec of this airflow was introduced through channels 35 into the prechamber. Liquid fuel (No. 2 distillate oil) was supplied through the nozzle at a flow rate of 0.109 lb/sec along with a minor flow of atomizing air supplied therethrough under a pressure of about 1.5 psig. The spray cone angle was from about 140° to 180°. The combustor pressure drop was about 0.78 psi, i.e. 5.3% of the product gas pressure (about 14.7 psia), as calculated from the pressure (about 15.5 psia) of the air supplied to the channels.

The $NO_x$ concentration in the product gas exiting the combustor was found to be substantially constant and averaged about 13 ppm, as measured for dried samples. The carbon monoxide concentration was found to be substantially constant and averaged about 1000 ppm in dried samples. The temperature profile measured across the planar exhaust opening showed temperatures of 2220° F. at the axis and 1830° F. at a point one inch from the combustor wall. (These values were measured with a 1/16 inch shielded thermocouple and were not corrected for radiation heat losses.)

Observation showed that autoignition and flashback were at least substantially avoided.

In the best mode contemplated for carrying out the invention, the combustor would be employed to provide combustion product gas as motive fluid for a gas turbine in electric power generation. It is contemplated that: the best total air flow rate would be about 50 lb/sec, the best liquid fuel flow rate would be about 1.1 lb/sec, and the best combustor pressure would be about 150 psia.

BEST MODE CONTEMPLATED

The best mode contemplated for carrying out this invention has been set forth in the description above, for example, by way of setting forth preferred structural arrangements, materials of construction, compositions and operating conditions, including but not limited to preferred ranges and values of amounts and other unobvious variables material to successfully practicing (including making and using) the invention in the best way contemplated at the time of executing this patent application. In the best mode, the relative amounts of air and fuel are selected such that an overall lean fuel/air mixture will be formed by the action occurring in the prechamber.

It is understood that the foregoing detailed description is given merely by way of illustration and that many modifications may be made therein without departing from the spirit or scope of the present invention.

What is claimed is:

1. A combustion apparatus for a gas turbine engine comprising, in combination:
    (a) a combustion liner defining a combustion chamber terminating at its upstream end in an inlet throat and termination downstream of said throat in an outlet for exhausting combustion gases,
    (b) a cyclonic prechamber assembly including
        (i) a cyclonic prechamber adapted to vaporize liquid fuel therein, said prechamber being substantially cylindrical through at least a portion of its axial extent, terminating at its downstream end in said throat, and opening to said combustion chamber through the throat;

(ii) a plurality of converging, spaced-apart highly-angled vanes disposed circumferentially about the cylindrical portion of said prechamber such that the ratio of "total chamber flow area" to the cylindrical area of said prechamber is from about 0.05:1 to about 0.5:1, with opposing faces of each pair of adjacent vanes defining inwardly converging airflow channels adapted to introduce air therethrough with a high tangential component of velocity into the prechamber;

(c) means in flow communication with the upstream end of said prechamber for introducing liquid fuel with a spray pattern in the form of a substantially hollow cone coaxial with said prechamber and having a vertex angle sufficiently large such that the introduced fuel is directed toward an upstream portion of each vane and not toward said throat opening, and (d) an ignitor in said combustion chamber for igniting fuel vapor received in premixed form from said prechamber.

2. The apparatus of claim 1, wherein said plurality of vanes is free of airflow channel-defining members adjacent the outer envelope containing the leading edges of said vanes.

3. The apparatus of claim 1, wherein each pair of adjacent vanes defines a "vane angle" of from about 60° to 90°.

4. The apparatus of claim 1, wherein the number of said vanes per one inch of diameter of the prechamber is at least 2.

5. The apparatus of claim 1, wherein the ratio of the "total channel flow area" to the cylindrical area of said prechamber is from about 0.1:1 to about 0.4:1.

6. A process for generating combustion products from liquid fuel for operating a gas turbine comprising (a) heating and pressurizing air;

(b) flowing the air resulting from step (a) through swirl-inducing members into a pre-chamber so as to impart substantial tangential velocity thereto during both start-up of combustion and during the continuous operating regime, (c) supplying liquid fuel in a spray pattern in the form of a substantially hollow cone coaxial with the pre-chamber, said cone having a vertex angle sufficiently large such that the introduced fuel is directed toward the swirl-inducing members, (d) mixing the liquid fuel and air and vaporizing a portion of the liquid fuel in the pre-chamber while impinging liquid fuel droplets greater than a predetermined size upon the swirl-inducing members, returning the deposited liquid fuel to the swirling mixture to effect additional vaporization of the returned liquid fuel, (e) intimately mixing the vaporized fuel with the swirling air, (f) discharging the intimately mixed vaporized fuel mixture through a throat into a combustion chamber, (g) burning the fuel in the combustion chamber and controlling the relative proportions of supplied fuel and flowed air so as to maintain a constantly lean overall ratio of fuel to air throughout the operating regime, and (h) concurrently controlling the tangential velocity of the air entering into the pre-chamber so as to insure vaporization and substantially homogeneous mixing of the fuel vapor with the air and to insure a sufficiently short elapsed time from formation of the fuel vapor to discharge of the mixture thereof with air into the combustion chamber such that auto ignition of the fuel is substantially prevented in the pre-chamber and formation of NOX during combustion is substantially reduced.

7. The process of claim 6 wherein the liquid fuel is supplied to the pre-chamber in atomized condition.

8. The process of claim 6, wherein the fuel is supplied at a location in the pre-chamber substantially coaxial therewith and coplanar with an upstream end region of the swirl-inducing members wherein upstream refers to location on the axis which extends downstream axially from the location of fuel introduction, said cone having a vertex angle of at least 120° or more.

* * * * *